United States Patent
Izumi (10) Patent No.: US 6,332,545 B1
(45) Date of Patent: Dec. 25, 2001

(54) SOLID-LIQUID SEPARATING APPARATUS

(75) Inventor: Shunji Izumi, Matsumoto (JP)

(73) Assignee: Izumi Products Company, Nagano (JP)

( * ) Notice: Subject to any disclaimer, the term of this patent is extended or adjusted under 35 U.S.C. 154(b) by 0 days.

(21) Appl. No.: 09/521,813

(22) Filed: Mar. 9, 2000

(30) Foreign Application Priority Data

May 13, 1999 (JP) .................................................. 11-133089

(51) Int. Cl.⁷ ......................... B01D 33/073; B01D 33/44
(52) U.S. Cl. ......................... 210/396; 210/407; 210/488; 210/497.01
(58) Field of Search ..................................... 210/327, 331, 210/330, 394, 396, 397, 407, 497.01, 488, 489, 158, 159

(56) References Cited

U.S. PATENT DOCUMENTS

| | | | |
|---|---|---|---|
| 1,649,581 | * | 11/1927 | Genter et al. . |
| 1,905,806 | * | 4/1933 | Clark . |
| 2,547,941 | * | 4/1951 | Heftler . |
| 3,096,278 | * | 7/1963 | Francom . |
| 3,625,362 | * | 12/1971 | Sicard . |
| 3,643,806 | * | 2/1972 | O'Cheskey . |
| 4,146,481 | * | 3/1979 | Nagatoshi et al. . |
| 4,153,557 | * | 5/1979 | Hori . |
| 4,279,750 | | 7/1981 | Hori . |
| 4,872,404 | * | 10/1989 | Quetsch et al. . |
| 5,026,487 | * | 6/1991 | Abdulmassih . |
| 5,118,414 | * | 6/1992 | Byers . |
| 5,228,987 | * | 7/1993 | Arvanitakis . |
| 5,389,256 | * | 2/1995 | McEwen et al. . |
| 5,656,162 | * | 8/1997 | Nilsson . |

FOREIGN PATENT DOCUMENTS

| | | |
|---|---|---|
| 1047170 | 10/1955 | (DE) . |
| 1113114 | 5/1968 | (GB) . |
| 8701313 | 1/1988 | (NL) . |

* cited by examiner

Primary Examiner—David A. Simmons
Assistant Examiner—Fred Prince
(74) Attorney, Agent, or Firm—Koda & Androlia (57) ABSTRACT

A solid-liquid separating apparatus comprising: a strainer which is in a cylindrical shape formed by a plurality of flat ring members with gaps in between; a casing which has an accommodating section for setting the strainer therein so that the accommodating section is divided by the strainer into a strainer inner region and a strainer outer region, and an intake port that introduces a mixture of a solid and liquid is formed in the strainer outer region and an outlet port that discharges to the outside the liquid that is separated from the solid and passes between the circular ring members and advances into the strainer inner region is formed in the strainer inner region; and a scraper that has plate-form protruding portions with tip ends thereof located in the gaps between the circular ring members of the strainer so as to scrape off the solid matter adhering to the flat surface of the circular ring members.

7 Claims, 5 Drawing Sheets

SOLID-LIQUID SEPARATING APPARATUS

BACKGROUND OF THE INVENTION

1. Field of the Invention

The present invention relates to a solid-liquid separating apparatus for separating solid matter, raw contaminants, etc. from liquid of a solid-liquid mix.

2. Prior Art

One of the conventionally known solid-liquid separating apparatuses is the one that is used in a raw contaminant dehydration treatment device.

This solid-liquid separating apparatus processes water-containing raw contaminants in the form of a solid-liquid mixture generated by mixing raw contaminants discharged from the kitchen with water and pulverizing this mixture. Such water-containing raw contaminants are introduced in the inside of the lower portion of a strainer and then conveyed to the upper portion of the strainer by the rotating vanes of a screw installed in the strainer. While the raw contaminants are being moved to the upper portion of the strainer, the water flows out of the strainer through countless number of small apertures (liquid flow passages) formed in the strainer. The raw contaminants are thus separated and discharged from the upper portion of the strainer in a dehydrated state.

In the above-described structure, solid matter such as pulverized raw contaminants, etc. and a liquid such as water, etc. that are contained in a mixture are separated by the strainer that has countless small apertures. However, this structure has problems. Though the solid matter adhering to the inner circumferential surface of the strainer can be constantly scraped off by the vanes, small particles of solid matter adhering to the inside wall surfaces of the small apertures that act as flow passages for the separated liquid cannot be scraped by the vanes. As a result, the small apertures tend to be clogged, and drainage of the liquid becomes insufficient. Also, the efficiency of solid-liquid separation drops, and frequent cleaning or replacement of the strainer becomes necessary. Such a clogging may be alleviated by way of using a thinner strainer so as to shorten the length of the liquid flow passages or by increasing the diameter of the small apertures. However, these measures cause an increase in the ratio of solid matter remaining in the separated liquid, leading to drainage contamination.

SUMMARY OF THE INVENTION

Accordingly, the present invention is to solve the above problems.

The object of the present invention is to provide a solid-liquid separating apparatus that can efficiently separate solid matter and liquids while preventing clogging of the strainer.

The above-object is accomplished by a unique structure for a solid-liquid separating apparatus of the present invention that comprises:

- a strainer which is formed into a cylindrical body by disposing a plurality of flat plate-form circular ring members side by side with gaps in between;
- a casing which has an accommodating section for setting the strainer therein, the casing being divided by the strainer into a strainer inner region and a strainer outer region so that an intake port for introducing a mixture of solid matter and a liquid is formed in the strainer outer region and an outlet port for discharging to the outside the liquid that flows between the circular ring members and enters into the strainer inner region is formed in the strainer inner region; and
- a scraper comprising plate-form protruding elements whose tip ends advance into the gaps between the circular ring members, the scraper being movable along the outer circumferential surfaces of the circular ring members so as to remove the solid matter adhering to the flat surfaces of the circular ring members.

With the structure above, the liquid contained in the mixture that is introduced into the outer region of the strainer is moved into the inner region of the strainer by passing through the gaps between the flat surface of the respective circular ring members that make up the strainer and discharged from the outlet port. On the other hand, since the solid matter cannot pass through the gaps between the circular ring members, it remains in the outer region of the strainer. Solid-liquid separation is thus accomplished.

Furthermore, unlike the small apertures used in conventional strainer structures in which the length of the liquid flow passages is equal to the thickness of the strainer, the liquid flow passages formed by the circular ring members in the present invention have at least the length that is the difference between the internal diameters and the external diameters of the circular ring members. Thus, the length of the liquid flow passage of the present invention is considerably longer compared to the conventional liquid flow passage that is formed by small apertures. Accordingly, the amount of solid matter that enters into the gaps between the circular ring members and adheres to the flat surfaces of the circular ring members increases, and the amount of solid matter that enters into the inner region of the strainer is reduced. As a result, the separating apparatus of the present invention provides an improved solid-liquid separation efficiency.

Furthermore, the solid matter that adheres to the flat surfaces of the circular ring members is constantly scraped away by the plate-form protruding elements of the scraper that are moved in relative terms along the outer circumferential surface of the strainer. Accordingly, clogging is prevented.

It is preferable that the strainer is installed in the accommodating section of the casing so as to be rotated with its rotating axis in a horizontal direction, and the intake port and outlet port are opened so that at least the outer circumferential surface of the upper portion of the strainer is above the liquid level of the mixture in the casing. In the present invention, it is also preferable that the scraper scrapes away the solid matter adhering to the flat surface of the strainer that is exposed above the liquid level of the mixture. With the structures described above, solid matter adhering to the strainer that is above the liquid level of the mixture is removed, and the solid matter that has thus been scraped away is prevented from re-mixing with the mixture. Thus, efficient solid-liquid separation is performed.

The scraper is disposed on the downstream side of the top area of the strainer with respect to the direction of rotation of the strainer. With this location of the scraper, solid matter adhering to the strainer and carried out of the liquid surface of the mixture travels a greater distance before being scraped away by the scraper. Accordingly, there is an increased opportunity for the liquid to be oozed out of the solid material, and the solid-liquid separation efficiency is greatly improved compared to cases in which the solid matter is scraped away immediately after leaving the liquid surface.

Furthermore, since the solid matter adhering to the strainer is scraped away by the scraper while the solid matter is being moved downward form the top area of the strainer, the solid matter that is scraped away can easily be removed from the strainer. Efficient scraping of the solid matter can thus be accomplished.

One or more projections are formed on the outer circumferential surface of at least one of the plurality of circular ring members so as to carry the solid matter contained in the mixture out of the liquid level of the mixture. More specifically, two types of circular ring members are employed: flat plate-form first circular ring members and flat plate-form second circular ring members. The second circular ring members have the same external diameter as the first circular ring members and have a plurality of projections formed on the outer circumferences at specified angular intervals. Using these circular ring members, the strainer is formed by disposing a plurality of the circular ring members side by side with specified gaps in between with the first circular ring members interposed between the second circular ring members, so that the strainer is of a cylindrical shape and has a plurality of ribs, that are formed by the projections of the second circular ring members, on its outer surface.

As a result, the solid matter contained in the mixture is scraped up and removed from the mixture by the projections (which form the ribs). Thus, much more efficient solid-liquid separation can be accomplished.

The outlet port provided in the separating apparatus of the present invention is opened in the accommodating section of the casing. It is located on the upstream side of the scraper with respect to the direction of rotation of the strainer, so that the solid matter that is scraped off by the scraper is removed to the outside of the casing through this discharge port. In addition, a cover member and an urging means that constantly urges the cover member toward the strainer are provided near the discharge port. The cover member is disposed so as to cover the discharge port. One end of the cover member is pivotally attached to the edge portion of the discharge port on the upstream side of the discharge port with respect to the direction of rotation of the strainer, so that the other end of the cover member (i. e., the side located on the downstream side of the discharge port with respect to the direction of rotation of the strainer) is free to swing about such one end.

With this structure, the solid matter moved by the rotating strainer is pressed by the cover member so that the liquid contained in the solid matter is squeezed out. Thus, the solid-liquid separation performance greatly improves.

In addition, a squeezing region can be formed somewhere between the intake port and the scraper. This squeezing region is formed so that the relative space between the outer circumferential surface of the strainer and the inner circumferential surface of the tubular accommodating section of the casing become gradually narrower in the direction of rotation of the strainer. By way of this structure, the liquid contained in the solid matter that is moved while adhering to the outer circumferential surface of the rotating strainer is further squeezed in the squeezing region, so that the dehydrating effect is greatly improved.

In the present invention, the intake port is located in a lower position than the outlet port. Thus, liquid constantly accumulates in the tubular accommodating section so as to be up to the level of the outlet port. This structure allows the solid matter contained in the liquid that enters into the tubular accommodating section via the intake port to be scattered in the accumulated liquid and spread generally around the outer circumferential surface of the strainer. Accordingly, a situation can be prevented that only a portion of the strainer always filters a part of the mixture that has high concentration of solid matter. Thus, efficient dehydration can be accomplished.

DETAILED DESCRIPTION OF THE PREFERRED EMBODIMENTS

Figure 1:
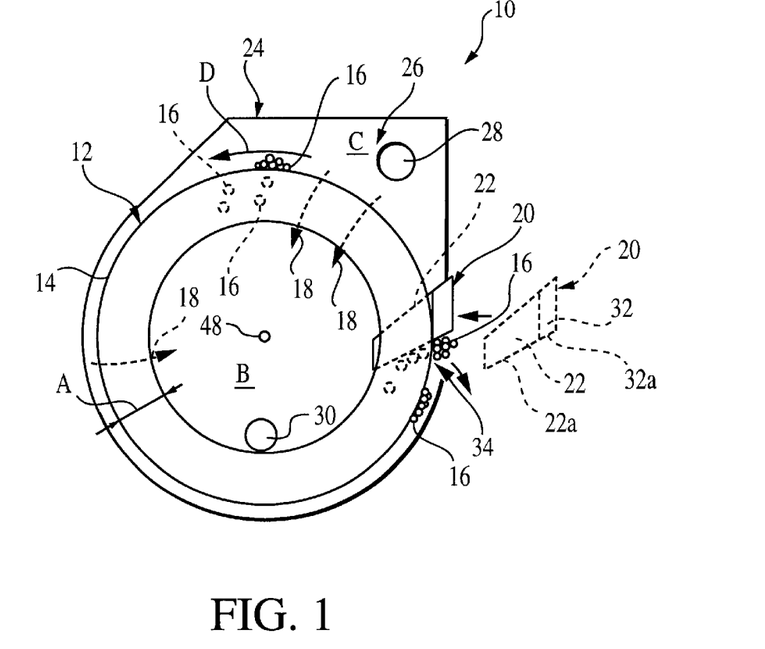
FIG. 1 is an explanatory diagram which illustrates the basic concept of the solid-liquid separating apparatus according to the present invention.
Figure 2:
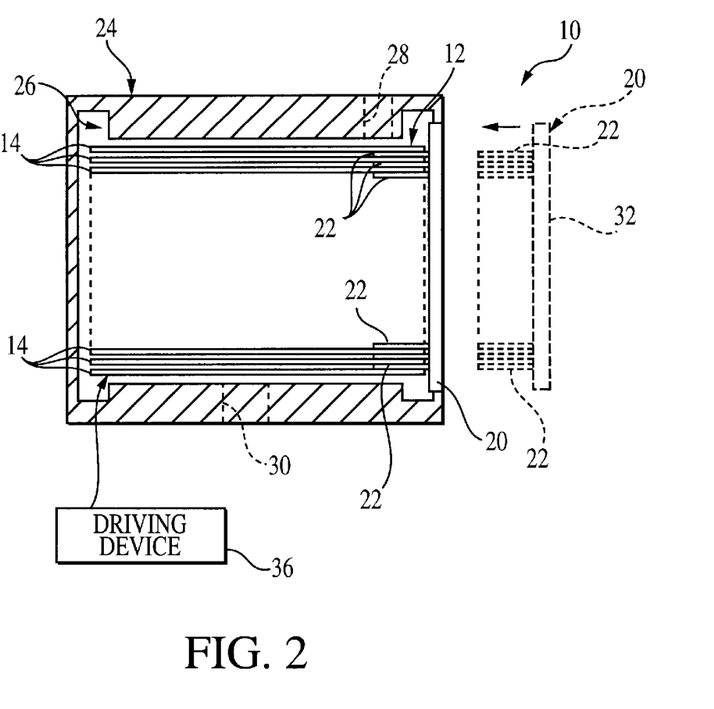
FIG. 2 is a sectional view taken along the axis of rotation of the strainer in the apparatus of FIG. 1.

First, the basic concept of the solid-liquid separating apparatus 10 of the present invention will be described with reference to FIGS. 1 and 2.

The strainer 12 used in the solid-liquid separating apparatus 10 is in a form of a cylindrical body and is obtained by stacking a plurality of flat plate-form circular ring members 14 (or disposing the flat plate-form circular ring members 14 side by side) with specified gaps between the respective circular ring members 14. The size of the gaps formed between the flat surfaces of the adjacent circular ring members 14 are determined by the size of the particles of the solid matter 16 contained in the mixture and separated from the liquid 18 by the strainer 12.

In other words, if the degree of contamination of the liquid 18 needs to be lowered by reducing the proportion of solid matter contained in the separated liquid 18, then the gaps between the circular ring members 14 are narrowed so that the amount of solid matter that can pass between the circular ring members 14 is reduced. For the opposite case, the gaps between the circular ring members 14 is broadened to some extent.

In the shown structure, the strainer 12 is formed as a cylindrical body, having a constant diameter by stacking the circular ring members 14 of the same external diameter. It is also possible to form the strainer 12 in a truncated cone shape so that the external diameter gradually becomes smaller toward one end of the strainer 12 by way of disposing the circular ring members 14 of smaller diameters toward the one end.

The gaps between the circular ring members 14 form liquid flow passages through which the liquid can flow. Accordingly, the difference between the external diameter and internal diameter of the circular ring members 14, or the width A of the circular ring members 14 as shown in FIG. 1, forms the liquid path length of the liquid flow passages. A part of the solid matter contained in the liquid that passes through the gaps between the circular ring members 14 (i. e., the gaps formed by the ring shape) adheres to the flat surfaces of the circular ring members 14 while the liquid is passing through the gaps. Accordingly, the amount of solid matter that adheres to the flat surfaces of the circular ring members 14 increases as the length of the liquid flow path, i. e. the width A of the flat surfaces of the circular ring members 14, increases.

As seen from the above, the width A of the flat surfaces of the circular ring members 14 affects the ability of the strainer 12 separating the liquid and solid matter. Therefore, it is desirable to increase this width A if the separating capacity is to be increased. On the other hand, as will be described later, the solid matter adhering to the flat surfaces of the circular ring members 14 is scraped away by the flat plate-form (fin-form) protruding elements 22 of the scraper 20; therefore, if the width A of the flat surfaces of the circular ring members 14 is too wide, the contact resistance between the protruding elements 22 and the circular ring members 14 increases, resulting in that a large driving force is necessary so as to rotate the strainer 12. In actual use of the separating apparatus, therefore, the width A of the flat surfaces of the circular ring members 14 is determined with consideration given to both the required driving force and the solid-liquid separating capacity.

The casing 24 has a tubular accommodating section (hereafter referred to simply as the "accommodating section") 26 that accommodates the strainer 12 therein. This accommodating section 26 is divided by the strainer 12 into a strainer inner region B and a strainer outer region C. Also, the strainer 12 is rotatably supported in the accommodating section 26, and the both end of the strainer 12 are closed. In addition, the strainer 12 is installed so that the rotating shaft 48 thereof is horizontal.

An intake port 28 that introduces the mixture of liquid and solid matter into the strainer outer region C inside the accommodating section 26 is provided in the upper portion of the accommodating section 26.

An outlet port 30 is formed in the accommodating section 26 so as to be located in the strainer inner region B and below the discharge port (which will be described later). The outlet port 30 discharges the liquid, that has entered into the strainer inner region B, to the outside of the accommodating section 26. As one example, the outlet port 30 is formed near the inner circumferential surface of the lower portion of the strainer 12.

The scraper 20 is comprised of a supporting member 32 and a plurality of flat plate-form (fin-form) protruding elements 22 provided on the supporting member 32. The tip ends of the protruding elements 22 enter into the spaces between the flat surfaces of the circular ring members 14, that make up the strainer 12, and reach the inner circumferential surfaces of the circular ring members 14. The supporting member 32 on which the protruding elements 22 are provided is disposed, as best seen from FIG. 2, so as to extend in the axial direction of the strainer 12; and the protruding elements 22 are disposed on a flat surface of the supporting member 32 that faces the strainer 12. One edge 22a of the protruding elements 22 and one edge 32a of the supporting member 32 that are located on the upstream side with respect to the direction of rotation D of the strainer 12 are, as best seen from FIG. 1, inclined with respect to the diameter of the strainer 12. Thus, the solid matter 16 that has been scraped away by the protruding elements 22 are gradually moved toward the outer circumferences of the circular ring members 14 along the inclined edges 22a and 32a as the strainer 12 rotates. Moreover, the strainer-side edge of the end surface of the supporting member 32, that is positioned on the upstream side with respect to the direction of rotation D of the strainer 12, is in contact with the outer circumferential surfaces of the circular ring members 14.

As a result of this structure of the scraper 20, solid matter 16 adhering to the flat surfaces of the circular ring members 14 is scraped away by the protruding elements 22, and solid matter 16 adhering to the outer circumferential surfaces of the circular ring members 14 is scraped away by the end surface of the supporting member 32 on the upstream side with respect to the direction of rotation D of the strainer 12. The solid matter 16 that has been thus scraped away is conducted by the inclined edges 22a of the protruding elements 22 and by the inclined edge 32a of the supporting member 32 and taken out of the casing 24 through a discharge port 34 provided on the upstream side of the scraper 20.

A driving device 36 rotates the strainer 12. It is a motor or the like, and the strainer 12 is caused to rotate continuously during the solid-liquid separation process.

With the structure described above, the solid matter 16 that is in the gaps between the flat surfaces of the circular ring members 14 which act as liquid flow passages, and the solid matter 16 that adheres to the flat surfaces and outer circumferential surfaces of the circular ring members 14, is constantly scraped away by the scraper 20. Accordingly, no clogging occurs in the strainer 12. Furthermore, the length of the flow passages of the liquid that passes through the strainer 12 is defined by the width A of the circular ring members 14, and this length is considerably longer than the length of flow passages that is defined by the thickness of a plate strainer of conventional construction in which small apertures are formed in the plate strainer. Thus, the amount of solid matter adhering to the inside surfaces of the liquid flow passages can increase correspondingly, and therefore, the solid-liquid separation performance can be improved.

Next, the solid-liquid separating apparatus 10 of the present invention will be described in a more concrete manner with reference to FIGS. 3 through 6. Constituting elements which are the same as in the above-described basic construction will be labeled with the same reference symbols, and a detailed description of such elements will be omitted.

Figure 3:
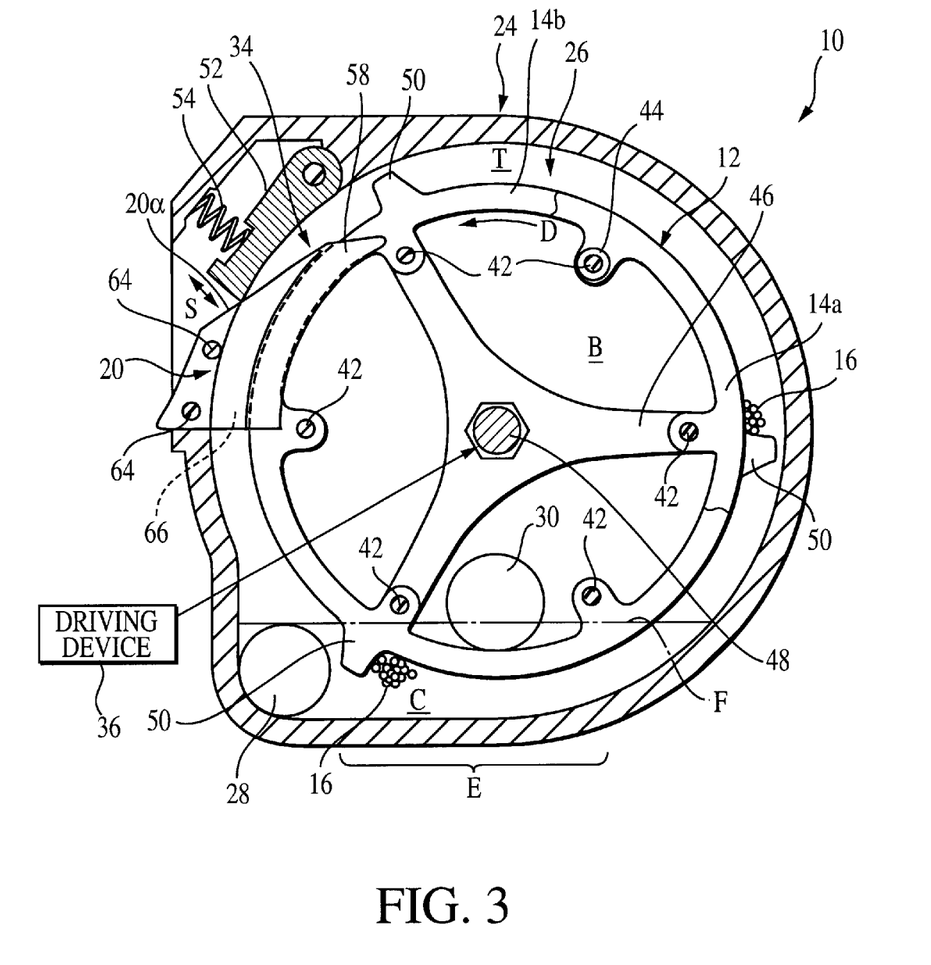
FIG. 3 is a sectional front view which illustrates the construction of one embodiment of the solid-liquid separating apparatus of the present invention.

The solid-liquid separating apparatus 10 comprises the strainer 12, the casing 24, the scraper 20 and the driving device 36 that rotates the strainer 12.

Figure 5:
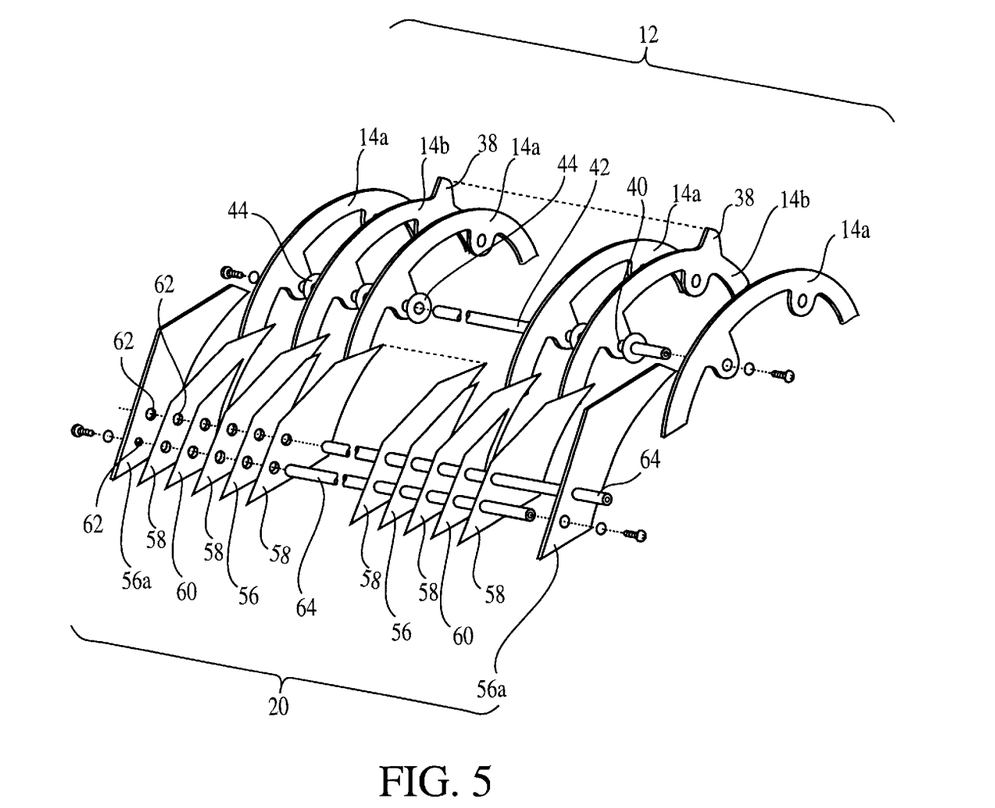
FIG. 5 is an exploded disassembled view of the strainer shown in FIG. 3.

A plurality of circular ring members 14 are stacked sideways or disposed side by side with gaps between these circular ring members 14 and form the strainer 12 of a cylindrical shape. The circular ring members 14 consist of two different types: flat plate-form first circular ring members 14a and flat plate-form second circular ring members 14b. The flat plate-form second circular ring members 14b are of the same external diameter as the first circular ring members 14a and have a plurality of (for example three) projections 38 that are formed at specified intervals on their outer circumferences.

Figure 4:
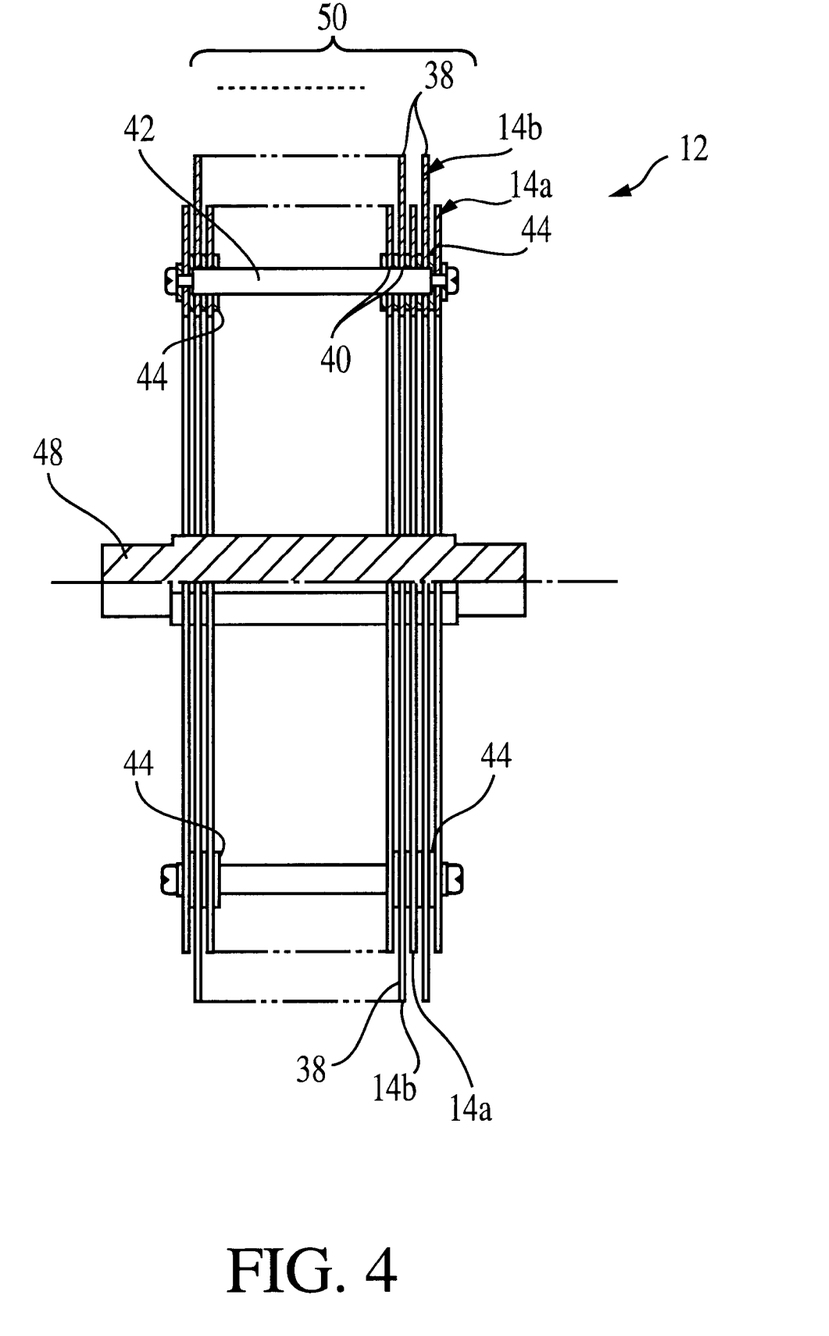
FIG. 4 is a side view of the strainer shown in FIG. 3.

The circular ring members 14a and 14b are, as best seen from FIG. 4, stacked sideways with specified gaps in between in such a manner that a specific number (one in FIGS. 4 and 5) of the first circular ring members 14a is interposed between adjacent second circular ring members 14b. The above-described specified gaps are obtained by spacers 44 as best shown in FIG. 5. In other words, the spacers 44 are fitted on first stays 42 that pass through through-holes 40 formed in the circular ring members 14a and 14b. However, any other elements can be used for obtaining the gaps.

Spokes 46 of a Y-shape, for instance, are connected to the inside of the circular ring members 14a and 14b; and a rotating shaft 48 is installed in the center of these spokes 46. Both ends of the rotating shaft 48 are rotatably supported on the casing 24. At least one end of the rotating shaft 48 protrudes to the outside of the casing 24, so that this end is rotationally driven by the driving device 36, thus rotating the strainer 12 in the direction shown by the arrow D in FIG. 3. The strainer 12 is rotated continuously; but it can be repeatedly rotated and stopped at fixed intervals and also rotated at an arbitrary time.

The second circular ring members 14b which have the projections 38 on their outer circumferential surfaces are arranged so that the projections 38 form the ribs 50 on the outer circumferential surface of the strainer 12. Thus, the ribs 50 extend in the axial direction of the strainer 12. In other words, the projections 38 of one second circular body 14b is positioned directly behind the projections 38 of the next second circular ring member 14b so that the ribs 50 are formed by these projections 38 when the strainer 12 is viewed from one end thereof. As a result, a plurality of ribs 50 that extend parallel to the axis of the strainer 12 are formed on the outer circumferential surface of the strainer 12. Since the first circular ring members 14a that have no projections 38 are interposed between the second circular ring members 14b, spaces are formed in the ribs 50.

The casing 24 has a tubular accommodating section 26 that accommodates the strainer 12. The strainer 12 is set inside the tubular accommodating section 26 so that the axis of rotation of the strainer 12, i.e., the rotating shaft 48 that is connected to the strainer 12, is oriented in a horizontal direction. The opening at both ends of the strainer 12 are closed off by a pair of opposite inside wall surfaces of the tubular accommodating section 26, so that movement of the liquid between the outer region C and inner region B of the strainer 12 is accomplished mainly by the gaps between the circular ring members 14a and 14b.

Furthermore, the intake port 28 which introduces a mixture of solid matter and liquid is opened in the wall near the bottom of the tubular accommodating section 26 so as to be located in the outer region C of the strainer. Also, the outlet port 30 which discharges the liquid separated from the solid matter to the outside of the casing 24 is opened in the wall of the tubular accommodating section 26 so as to be located in the inner region B of the strainer 12. The intake port 28 is located at a lower position than the outlet port 30 as seen from FIG. 3. Thus, the mixture constantly accumulates in the lower portion of the tubular accommodating section 26, the lower portion of the strainer 12 is immersed in the mixture, and the upper portion of the strainer 12 is exposed above the liquid level F of the mixture as shown in FIG. 3.

The discharge port 34 is opened in the upper portion of the tubular accommodating section 26 so that the discharge port 34 is located in the outer region C of the strainer 12. The discharge port 34 extends in the direction of the axis of rotation of the strainer 12 so that it removes the solid matter 16, that has been separated from the liquid and carried along the inner circumferential surface of the tubular accommodating section 26 by the ribs 50, to the outside of the casing 24.

The discharge port 34 opens into the space of the tubular accommodating section 26 above the liquid level F of the mixture. The discharge port 34 is located on the downstream side of the top area T of the strainer 12 with respect to the direction of rotation D of the strainer 12 and is on the upstream side of the scraper 20 with respect to the direction of rotation D of the strainer 12 as best seen from FIG. 3.

The cover member 52 is disposed on the discharge port 34 of the casing 24 so that the discharge port 34 is closed by the cover member 52. More specifically, one end of the cover member 52 is pivotally connected to the edge of the discharge port 34 located on the upstream side of the discharge port 34 with respect to the direction of rotation D of the strainer 12, so that the other end of the cover member 52 that is on the downstream side with respect to the direction of rotation D of the strainer 12 is moved or swings toward and away from the discharge port 34 as shown by arrow S.

The cover member 52 is constantly urged toward the strainer 12 by an urging means, or a spring, 54. The spring 54 is coupled at one end thereof to the casing 24 and coupled at another end thereof to the cover member 53.

By way of bias of the spring 54, the cover member 52 presses the solid matter 16 that is pushed and moved by the ribs 50 of the strainer 12 against the outer circumferential surface of the strainer 12 so as to squeeze the liquid out of the solid matter 16. The cover member 52 and spring 54 can be omitted, so that the solid matter scraped away by the scraper 20 is discharged as is (or without being pressed by the cover member 52)" to the outside of the casing 24 from the discharge port 34.

The tubular accommodating section 26 is formed with a squeezing region E in at least one area therein. In the squeezing region E, the space between the outer circumferential surface of the strainer 12 and the inner circumferential surface of the tubular accommodating section 26 gradually narrows toward the discharge port 34 from the intake port 28 along the direction of rotation D of the strainer 12.

In FIG. 3, the squeezing region E extends from the intake port 28 to the vicinity of the outlet port 30. The squeezing region E can be formed in a particular area in the region that extends from the intake port 28 to the discharge port 34; and alternatively, it can be formed in the entire region that extends from the intake port 28 to the discharge port 34 so that the squeezing region E gradually narrows toward the discharge port 34. Instead of near the vicinity of the intake port 28 as shown in FIG. 3, the squeezing region E can be formed near the cover member 52.

With this structure that includes both cover member 52 and squeezing region E, the amount of liquid contained in the solid matter 16 can be greatly reduced, and the solid-liquid separation performance is improved.

In cases where a good separating capability is obtained by only the cover member 52 or the squeezing region E, it is sufficient to use only one of these two elements. It is also possible to eliminate both the cover member 52 and the squeezing region E in view of the demand of simplification of the structure, the decrease in product cost, etc.

As seen from FIG. 5, the scraper 20 is constructed by stacking sideways a plurality of flat plates; and as shown in FIG. 3, the scraper 20 is disposed on the downstream side of the top area T of the strainer 12 with respect to the direction of rotation D of the strainer 12. In addition, the scraper 20 is disposed near the discharge port 34 so that it is located on the downstream side of the discharge port 34 with respect to the direction of rotation D of the strainer 12.

In the shown embodiment, the scraper 20 and discharge port 34 are disposed on the downstream side of the top area T of the strainer 12 with respect to the direction of rotation D of the strainer 12. However, these elements can be disposed in the vicinity of the top area T of the strainer 12, and it is also possible to install these elements on the upstream side of the top area of the strainer 12 with respect to the direction of rotation D of the strainer 12 so that they are at a location that does not reach the liquid level F of the mixture.

The scraper 20 will be further described below in regards to its more concrete structure.

The scraper 20 is comprised of plate-form first protruding elements 56, plate-form second protruding elements 58 and supporting elements 60.

Each of the first protruding elements 56 is formed from a plate that has the same thickness as that of the respective first circular ring members 14a that make up the strainer 12, and the tip end (upper end in FIG. 5) of the first protruding element 56 protrudes toward the outer circumferential surface of each one of the first circular ring members 14a so as to scrape away solid matter 16 adhering to the outer circumferential surfaces of the first circular ring members 14a.

Each of the second protruding elements 58 is formed from a plate material that has the same thickness as each one of the gaps between the first circular ring members 14a and second circular ring members 14b. The tip end (upper end in FIG. 5) of the second protruding element 58 advances into the gaps between the first and second circular ring members 14a and 14b so as to scrape away solid matter 16 adhering to the respective flat surfaces of the circular ring members 14a and 14b.

Each of the supporting elements 60 is formed from a plate material that has the same thickness as that of the respective second circular ring members 14b that have projections 38 on their outer circumferential surfaces.

The first protruding elements 56, second protruding elements 58 and supporting elements 60 are, as seen from FIG. 4, disposed in a specified order in accordance with the disposing order of the first circular ring members 14a and second circular ring members 14b that make up the strainer 12. More specifically, the first protruding elements 56 are positioned so as to face the circumferential surfaces of the first circular ring members 14a, the second protruding elements 58 are positioned so that pointed end areas thereof enter into the gaps between the circular ring members 14a and 14b, and the supporting elements 60 are positioned so as to face the circumferential surfaces of the second circular ring members 14b. The first protruding elements 56, second protruding elements 58 and supporting elements 60 are further formed into an integral unit by second stays 64 that pass through through-holes 62 formed in these elements.

In this structure, the gaps between the respective circular ring members 14a and 14b are set to be smaller than the thickness of the respective circular ring members 14a and 14b. As a result, the thickness of the second protruding elements 58 that advance into the gaps between the respective circular ring members 14a and 14b is smaller than the thickness of the circular ring members 14a and 14b. Thus, the strength of the second protruding elements 58 might be insufficient; accordingly, the second protruding elements 58 are reinforced by being interposed between the first protruding elements 56 and the supporting elements 60 that are positioned on both sides of the second protruding elements 58.

In the structures shown in FIGS. 4 and 5, the first circular ring members 14a are positioned at both ends of the strainer 12 (which is a cylindrical shape as a whole). Accordingly, the first protruding element 56, the second protruding element 58 and the supporting element 60 are disposed in this order from one end of the scraper 20, thus forming a "unit"; and this "unit" is repeated in the direction of the second stays 64, and the first protruding element 56 is disposed at another end of the scraper 20.

In the structure shown in FIG. 5, the first protruding elements 56a which are positioned at both ends of the scraper 20 differ in shape from other first protruding elements 56 positioned in the intermediate portions of the scraper 20. In other words, the first protruding elements 56a at both ends are larger and have a broader area compared to other first protruding elements 56. The intention is to have these first protruding elements 56a at both ends hold the cover member 52 (positioned on the upstream side of the scraper 20 with respect to the direction of rotation D of the strainer 12) from both sides so that both ends of the cover member 52 are covered by these first protruding elements 56a.

The operation of the solid-liquid separating apparatus 10 structure as above will be described.

The driving device 36 is actuated so that the strainer 12 starts continuously rotating inside the casing 24.

A mixture of solid matter 16 and a liquid is introduced into the outer region C (see FIGS. 1 and 3) of the strainer 12 in the lower portion of the tubular accommodating section 26 via the intake port 28. The liquid passes through the gaps between the first circular ring members 14a and second circular ring members 14b that make up the strainer 12 and enters the inner region B of the strainer 12. Then, the liquid goes out of the casing 24 via the outlet port 30.

Meanwhile, taking into consideration the external dimensions of the solid matter 16 that is to be separated from the liquid, the gaps between the first circular ring members 14a and second circular ring members 14b are set so that the solid matter 16 is not allowed to pass through the gaps. Accordingly, most of the solid matter 16 accumulates on the outer circumferential surface of the strainer 12. Some of the solid matter 16 with small external dimensions advances into the gaps between the first circular ring members 14a and second circular ring members 14b. In the present invention, the difference between the external diameter and internal diameter of the respective circular ring members 14a and 14b is set to be the length of the liquid flow passages of the strainer 12, which is longer than the length of the flow passages in conventional strainers. Accordingly, such solid matter that advances into the gaps adheres to the respective flat surfaces of the first and second circular ring members 14a and 14b, and the amount of the adhering solid matter is greater than that in conventional strainers.

A primary solid-liquid separation is thus performed.

As seen from FIG. 3, the liquid outlet port 30 is formed slightly above the intake port 28. Accordingly, the liquid level F of the mixture inside the tubular accommodating section 26 reaches only a part of the outlet port 30, and the mixture accumulates in the lower portion of the tubular accommodating section 26. Thus, the lower portion of the strainer 12 is constantly in the liquid mixture. As a result of this structure, the mixture introduced through the intake port 28 is mixed with the mixture previously introduced into the tubular accommodating section 26 and accumulated in the tubular accommodating section 26, and the solid matter contained in the mixture is further diffused in the accumulated mixture. As a result, a situation in which only a part of the outer circumferential surface of the strainer 12 contacts the mixed liquid with an extremely high concentration of solid matter can be prevented, and the adhesion of larger amount of solid matter to a particular part of the outer circumferential surface of the strainer 12 is avoided. Thus, clogging at such a particular part of the strainer 12 that would occur temporarily is prevented.

The solid matter 16 that accumulates on the outer circumferential surface of the strainer 12 is caught and collected by the ribs 50 formed on this outer circumferential surface, and this solid matter is moved by the ribs 50 along the inner circumferential surface of the tubular accommodating section 26 as the strainer 12 rotates.

As seen from FIG. 3, the bottom portion of the inner circumferential surface of the tubular accommodating section 26 is formed substantially flat, and the side wall continuous from this flat bottom gradually rises in a circular arc shape along the direction of rotation D of the strainer 12. Accordingly, in the area where the flat bottom shifts to the arc-shaped side wall, the gap between the outer circumferential surface of the strainer 12 and the inner circumferential surface of the tubular accommodating section 26 gradually narrows. This area thus forms the squeezing region E.

As a result, the solid matter 16 that is collected and pushed by the ribs 50 passes through this squeezing region E, the solid matter is compressed between the outer circumferential surface of the strainer 12 and the inner circumferential surface of the tubular accommodating section 26, the liquid component contained in the solid matter is further squeezed out, and the solid matter 16 is moved above the liquid level F of the mixture as the strainer 12 rotates.

A secondary solid-liquid separation is thus performed.

The liquid that has thus been squeezed out passes through the strainer 12, enters the inner region B of the strainer 12, and is discharged from the outlet port 30. When the ribs 50 emerge above the liquid level F of the mixture, solid matter 16 remains on the surfaces of the ribs 50. Accordingly, liquid oozed out from the solid matter 16 may pass through to the back sides of the ribs 50 via the gaps in the ribs 50, so that this liquid is re-mixed with the mixture.

Furthermore, by the rotation of the strainer 12, the solid matter 16 is pushed by the ribs 50 and moved along the inner circumferential surface of the tubular accommodating section 26 through the region above the liquid level F. During this process as well, the liquid oozing out from the solid matter 16 passes through the strainer 12 and falls into the bottom of the inner region B of the strainer 12. Thus, a solid-liquid separation is performed during this movement of the solid matter as well.

In the shown embodiment, the scraper 20 and discharge port 34 are, as best seen from FIG. 3, positioned on the downstream side of the top area T of the strainer 12 with respect to the direction of rotation of the strainer 12. Accordingly, solid matter 16 adhering to the strainer 12, or solid matter 16 scraped away by the ribs 50 and emerged to the outside of the liquid level F of the mixture, is moved a longer distance through the space above the liquid level F before the solid matter reaches the scraper 20 and discharge port 34. Thus, there is an increased opportunity for liquid to be oozed out from the solid matter 16, and an improved solid-liquid separation performance is assured compared to cases where the solid matter is scraped away immediately after emerging above the liquid level F.

Furthermore, the solid matter 16 that is moved by the strainer 12 is scraped away by the scraper 20 while the solid matter is being moved downward from the top area T of the strainer 12. Accordingly, the solid matter 16 that has thus been scraped away can easily be removed from the strainer 12 and discharged from the discharge port 34. The solid matter 16 is thus scraped away and discharged with good efficiency.

When the solid matter 16 is further moved and enters the region of the discharge port 34 after passing the top area T of the strainer 12, the liquid component still contained in the solid matter 16 is squeezed out by the cover member 52 which is installed on this discharge port 34 and is constantly urged toward the strainer 12 by the spring 54.

A third solid-liquid separation is thus performed.

Here, the liquid squeezed out of the solid matter 16 by being pressed by the cover member 52 passes through the gaps between the respective circular ring members 14a and 14b of the strainer 12 and flows down into the inner region B of the strainer 12. This liquid flows toward the bottom of the tubular accommodating section 26 via an arc-form flow passage 66. This flow passage 66 is the region that is defined by the inner edge surface of the supporting element 60 (each of which being positioned so as to face the outer circumferential surfaces of the respective second circular ring members 14b that have projections 38 on their outer circumferential surfaces) and the flat surfaces of the adjacent two second protruding elements 58 (which sandwich the supporting elements 60 and are positioned so as to face the circumferential surfaces of the second circular ring members 14b). Some of the liquid may flow to the back sides of the ribs 50 by passing through the gaps in the ribs 50 and further into the outer region B of the strainer 12 by passing through the gaps between the respective circular ring members 14a and 14b.

When the solid matter 16 reaches a midway point of the inner surface of the cover member 52, the solid matter 16 adhering to the outer circumferential surfaces of the first circular ring members 14a is scraped away by the first protruding elements 56 of the scraper 20. Also, the solid matter 16 adhering to the respective flat surfaces of the first circular ring members 14a and second circular ring members 14b is also scraped away by the second protruding elements 58.

Then, the solid matter thus scraped away by the first and second circular ring members 14a and 14b of the scraper 20 is transferred from the strainer 12 to the upper surface of the scraper 20. As seen from the description made with reference to the protruding elements 22 that have inclined edges 22a in FIG. 1, the upper portion 20a of the scraper 20 is, as best seen from FIG. 3, formed as an inclined plane that extends downward along a tangential direction of the strainer 12. Accordingly, the solid matter 16 transferred onto the upper surface 22a of the scraper 20 is pushed by the rib 50 of the strainer 12 along the inclined orientation of the scraper 20, thus overcoming the urging force of the spring 54 and opening the cover member 54, and is discharged outside the casing 24.

The present invention is not limited to the structure described above. In view of the structure of the scraper 20, the rotating shaft 48 of the strainer 12 can be set in a direction other than horizontal, e.g. in an inclined direction. In this case as well, at least the scraper 20 and discharge port 34 are provided so as to be positioned outside the liquid level F of the mixture accumulated in the lower portion of the accommodating section 26.

Also, in the above embodiment, the ribs 50, which are formed on the outer circumferential surface of the strainer 12 by the adjacent projections 38 of the second circular ring members 14b, extend straight in the axial direction of the strainer 12. However, these ribs 50 can take another shape. For example, the ribs 50 can be formed in a spiral shape on the outer circumferential surface of the strainer 12a. These spiral ribs are obtained by arranging the second circular ring members 14b so that the projections 38 are circumferentially slightly shifted from the projections 38 of the adjacent second circular ring members 14b. With these spiral ribs, the solid matter 16 moved by one rib 50 passes through the squeezing region E while crossing in a diagonal direction. Accordingly, the resistance force applied to the driving device 36 that drives the strainer 12 can be smaller compared to the structure that involves the straight ribs. Thus, the strainer 12 can be rotated by a weaker driving force.

Furthermore, unlike the structure in which the strainer 12 is rotated and the scraper 20 is fixed as in the described embodiment, a structure in which the strainer 12 is stationary and the scraper 20 is rotated can be employed.

Moreover, it is also possible to form the external shape of the strainer 12 in a truncated cone and not cylindrical as the described embodiment. In this case, the circular ring members 14a and 14b of different diameters are used, so that larger diameter ring members are provided at one end, and smaller diameter ring members are provided toward another end.

Figure 6:
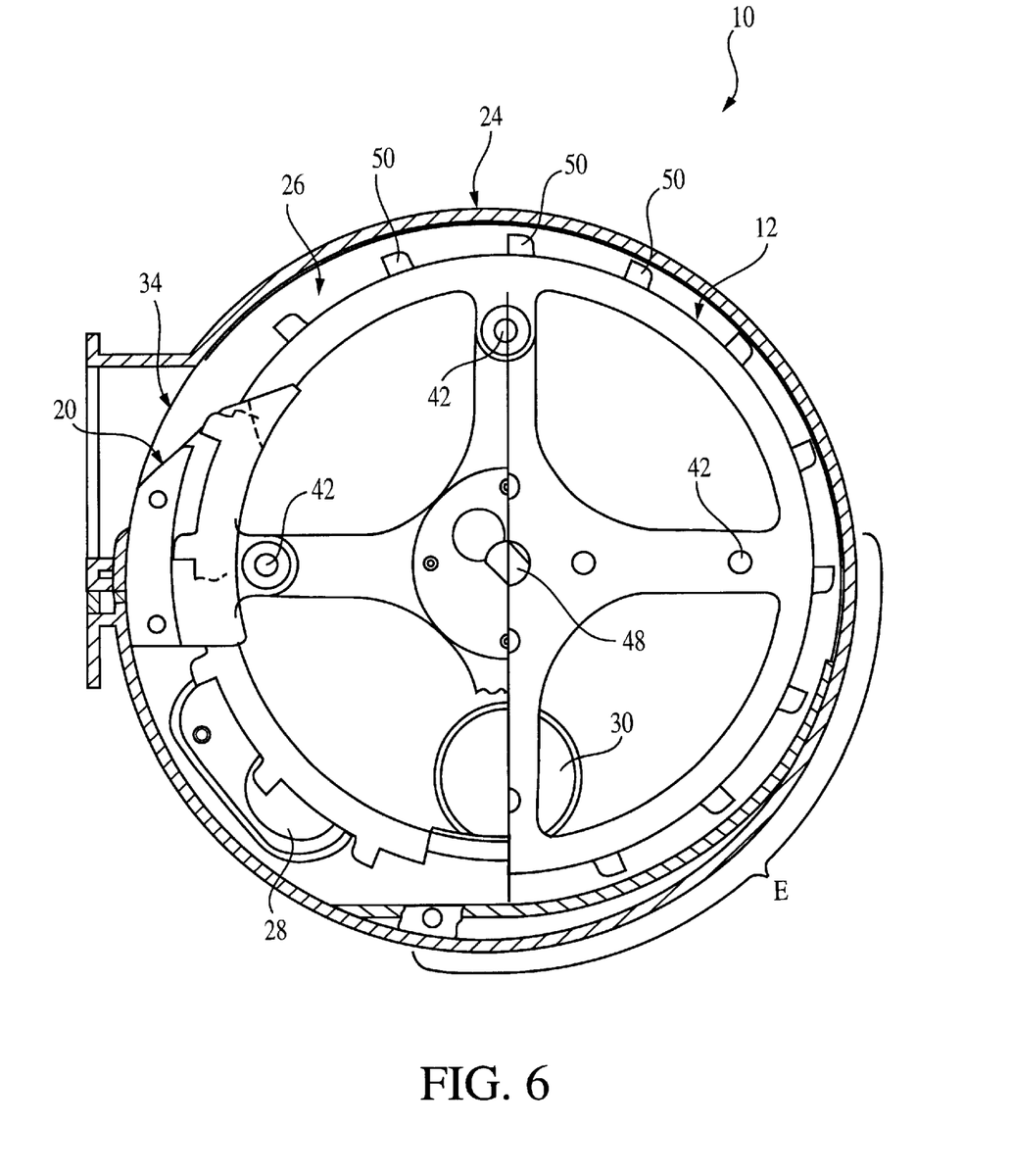
FIG. 6 is a sectional front view which illustrates the construction of another embodiment of the solid-liquid separating apparatus according to the present invention.

Furthermore, the solid-liquid separating apparatus 10 can be designed as shown in FIG. 6. In this structure, the space between the outer circumferential surface of the strainer 12 and the inner circumferential surface of the tubular accommodating section 26 is minimum at its midway point and then gradually becomes broader toward the discharge port 34. With this structure, the force applied by the outer circumferential surface of the strainer 12 and inner circumferential surface of the tubular accommodating section 26 to the solid matter 16 that is moved by the strainer 12 becomes gradually smaller. Thus, it is possible to smoothly discharge the solid matter 16 that is carried by the ribs 50.

In the structure of FIG. 6, the cross-sectional shape of the inner circumferential surface of the tubular accommodating section 26 is substantially circular, and the strainer 12 with a circular cross-sectional shape is installed in this tubular accommodating section 26 with the rotating shaft 48 offset from the center of the tubular accommodating section 26. As a result, the space between the outer circumferential surface of the strainer 12 and the inner circumferential surface of the tubular accommodating section 26 reaches its minimum at the midway point (right-side end in FIG. 6) between the intake port 28 and the discharge port 34. In the embodiment of FIG. 6, the cover member (52) is not used.

The above embodiments are described with reference to a solid-liquid separating apparatus which is used in a raw contaminant dehydration treatment device, and water is separated from pulverized raw contaminants. However, it goes without saying that the separating apparatus of the present invention can be used for separating other combinations than raw contaminants and water.

As seen from the above description, in the solid-liquid separating apparatus of the present invention, the strainer is comprised of a plurality of stacked circular ring members with gaps in between, and solid matter adhering to the flat surfaces of the circular ring members that make up this strainer is scraped away by a scraper. Accordingly, though the gaps between the circular ring members can be set narrow, any clogging caused by the accumulation of solid matter in the spaces between the flat surfaces of the circular ring members that form liquid flow passages can be avoided. Thus, a good solid-liquid separation capacity is assured. Furthermore, since clogging would not occur, the difference between the internal diameter and external diameter of the circular ring members can be greater, and as a result, longer liquid flow passages are obtained compared to structures in which small apertures are formed in a plate so as to function as liquid flow passages as in conventional apparatuses. Thus, more solid matter entering into the gaps between the circular ring members will adhere to the flat surfaces of the circular ring members and removed, greatly improving the filtering effect.

In addition, since the amount of resident solid matter adhering to the strainer can be thus reduced, putrefaction of solid matter is less likely to occur, and the generation of disagreeable odors, etc. can also be eliminated.

What is claimed is:

1. A solid-liquid separating apparatus comprising:
   a strainer which is in a cylindrical shape formed by a plurality of flat plate-form circular-ring members arranged to be next to each other with gaps in between, said gaps for separating a solid from a liquid;
   a casing which has therein an accomodating section that accomodates said strainer, said accomodating section being divided by said strainer into a strainer inner region and a strainer outer region so that an intake port that introduces a mixture of solid matter and liquid is formed in said strainer outer region and an outlet pot that discharges to outside said liquid that has passed through said gaps between said circular ring members and advanced into said strainer inner region is formed in said strainer inner region; and
   a scraper which has plate-form protruding elements whose tip ends advance into said gaps between said circular ring members so as to remove solid matter adhering to flat surfaces of said circular ring members; and wherein
   said strainer is installed so as to rotate about a horizontal axis thereof in said accomodating section;
   said intake port and said outlet port are opened in said accomodating section of said casing so that at least an upper portion of said strainer is exposed out of said mixture; and
   said scraper scrapes away said solid matter adhering to a part of said strainer that is exposed above said mixture.

2. The solid-liquid separating apparatus according to claim 1, wherein said scraper is provided in a downstream side of a top area of said strainer with respect to a direction of rotation of said strainer.

3. A solid-liquid separating apparatus comprising:
   a strainer which is in cylindrical shape formed by a plurality of flat plate-form circular ring members arranged to be next to each other with gaps in between, said gaps for separating a solid from a liquid;
   a casing which has therein an accomodating section that accomodates said strainer, said accomodating section being divided by said strainer into a strainer inner region and a strainer outer region so that an intake port that introduces a mixture of solid matter and liquid that has passed through said gaps between said circular members and advanced into said strainer inner region is formed in said strainer inner region; and
   a scraper which has plate-form protruding elements whose tip ends advance into said gap between said circular ring members so as to remove solid matter adhering to flat surfaces of said circular ring members; and wherein
   at least one of said plurality of circular ring members is provided with at least one projection on an outer circumferential surface thereof so as to move said solid matter contained in said mixture above said mixture.

4. A solid-liquid separating apparatus comprising:
   a strainer which is in a cylindrical shape formed by a plurality of flat plate-form circular ring members arranged to be next to each other with gaps in between, said gaps for separating a solid from a liquid;
   a casing which has therein an accomodating section that accomodates said strainer, said accomodating section being devided by said strainer into a strainer inner region and a strainer outer region so than an intake port that introduces a mixture of solid matter and liquid is formed in said strainer outer region and an outlet port that discharges to outside said liquid that has passed through said gaps between said circular ring members and advanced into said strainer inner region is formed in said inner region; and a scraper which has plate-form protruding elements whose tip ends advance into said gaps between said circular ring members so as to remove solid matter adhering to flat surfaces of said circular ring members; and wherein;

said circular ring members comprise flat plate-form first circular ring members and flat plate-form second circular ring members, said second circular ring members being of a same external diameter as said first circular ring members and provided with a plurality of said projections on outer circumferences thereof at specified angular intervals; and said strainer is in a shape of a cylinder obtained by a plurality of said circular ring members disposed with gaps in between so that said first circular ring members are interposed between said second circular ring members, said strainer having a plurality of ribs formed by said projections formed on outer circumferential surfaces of said second circular ring members.

5. A solid-liquid separating apparatus comprising:

a strainer which is in a cylindrical shape formed by a plurality of flat plate-form circular ring members arranged to be next to each other with gaps in between;

a casing which has therein an accommodating section that accommodates said strainer, said accommodating section being divided by said strainer into a strainer inner region and a strainer outer region so that an intake port that introduces a mixture of solid matter and liquid is formed in said strainer outer region and an outlet port that discharges to outside said liquid that has passed through said gaps between said circular ring members and advanced into said strainer inner region is formed in said strainer inner region;

a scraper which has plate-form protruding elements whose tip ends advance into said gaps between said circular ring members so as to remove solid matter adhering to flat surfaces of said circular ring members;

a discharge port which opens in said accommodating section and is located on an upstream side of said scraper with respect to said direction of rotation of said strainer so as to discharge said solid matter that is scraped away by said scraper to outside of said casing;

a cover member disposed at said discharge port, said cover member being pivotally attached at one end thereof to an edge of said discharge port on an upstream side of said discharge port with respect to said direction of rotation of said strainer, so that another end of said cover member which is on a downstream side of said discharge port with respect to said direction of rotation of said strainer is swingable about said one end; and an urging means which urges said cover member toward said strainer.

6. A solid-liquid separating apparatus comprising:

a strainer which is in a cylindrical shape formed by a plurality of flat plate-form circular ring members arranged to be next to each other with gaps in between;

a casing which has therein an accommodating section that accommodates said stainer, said accommodating section being divided by said strainer into a strainer inner region and a strainer outer region so that an intake port that introduces a mixture of solid matter and liquid is formed in said strainer outer region and an outlet port that discharges to outside said liquid that has passed through said gaps between said circular ring members and advanced into said strainer inner region is formed in said strainer inner region;

a scraper which has plate-form protruding elements whose tip ends advance into said gaps between said circular ring members so as to remove solid matter adhering to flat surfaces of said circular ring members; and a squeezing region formed in an area between said intake port and said scraper, said squeezing region being a space between an outer circumferential surface of said strainer and an inner circumferential surface of a tubular accommodating section becomes gradually narrower in said direction of rotation of said strainer.

7. The solid-liquid separating apparatus according to claim 1, wherein said intake port is located lower than said outlet port.

* * * * *

UNITED STATES PATENT AND TRADEMARK OFFICE
CERTIFICATE OF CORRECTION

PATENT NO. : 6,332,545 B1  
DATED : December 25, 2001  
INVENTOR(S) : Shunji Izumi It is certified that error appears in the above-identified patent and that said Letters Patent is hereby corrected as shown below:

Column 14,  
Line 4, change "circular-ring" to -- circular ring --  
Lines 7, 23, 25, 39 and 61, change "accomodating" to -- accommodating --  
Lines 8, 40 and 62, change "accomodates" to -- accommodates -- and change "accomodating" to -- accommodating --  
Line 12, change "outlet pot" to -- outlet port --  
Line 21, after "wherein" insert -- : --  
Line 35, after "which is in" insert -- a --  
Line 43, after "liquid" insert -- is formed in said strainer outer region and an outlet port that discharges to outside said liquid --  
Line 44, after "circular" insert -- ring --  
Line 48, change "gap" to -- gaps --  
Line 63, change "devided" to -- divided --  
Line 64, change "than" to -- that --

Column 15,  
Line 4, after "said" insert -- strainer --  
Line 9, after "wherein" insert -- : --

Column 16,  
Line 19, change "stainer" to -- strainer --

Signed and Sealed this

First Day of July, 2003

JAMES E. ROGAN  
*Director of the United States Patent and Trademark Office*